(12) United States Patent
Brown et al.

(10) Patent No.: US 11,087,782 B1
(45) Date of Patent: Aug. 10, 2021

(54) SHIELDING BETWEEN HEADS FOR TAPE DRIVE

(71) Applicant: Western Digital Technologies, Inc., San Jose, CA (US)

(72) Inventors: Diane L. Brown, San Jose, CA (US); Edward Hin Pong Lee, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/903,253

(22) Filed: Jun. 16, 2020

(51) Int. Cl.
| | | |
|---|---|---|
| *G11B 5/115* | (2006.01) | |
| *G11B 5/265* | (2006.01) | |
| *G11B 5/245* | (2006.01) | |
| *G11B 5/008* | (2006.01) | |
| *G11B 5/31* | (2006.01) | |
| *G11B 5/39* | (2006.01) | |
| *G11B 5/29* | (2006.01) | |

(52) U.S. Cl.
CPC ........ *G11B 5/2457* (2013.01); *G11B 5/00817* (2013.01); *G11B 5/115* (2013.01); *G11B 5/265* (2013.01); *G11B 5/29* (2013.01); *G11B 5/3146* (2013.01); *G11B 5/3948* (2013.01); *G11B 5/3954* (2013.01)

(58) Field of Classification Search
None
See application file for complete search history.

(56) References Cited

U.S. PATENT DOCUMENTS

| | | | |
|---|---|---|---|
| 6,496,329 B2 * | 12/2002 | Hungerford | G11B 5/3103 360/121 |
| 6,970,314 B2 | 11/2005 | Watson et al. | |
| 7,265,940 B2 * | 9/2007 | Nagai | G11B 5/584 360/121 |
| 7,266,880 B2 | 9/2007 | Biskebom et al. | |
| 7,365,531 B2 | 4/2008 | Che et al. | |

(Continued)

FOREIGN PATENT DOCUMENTS

| | | |
|---|---|---|
| EP | 0840924 B1 | 9/2001 |
| JP | 2006054044 A | 2/2006 |
| JP | 2008123596 A | 5/2008 |

OTHER PUBLICATIONS

Biskeborn, R.G., "Hard-disk-drive Technology Flat Heads for Linear Tape Recording"; IEEE Xplore, IBM, vol. 47, No. 4, Jul. 2003 (16 pages).

*Primary Examiner* — Jefferson A Evans
(74) *Attorney, Agent, or Firm* — Patterson & Sheridan, LLP; Steven H. Versteeg

(57) ABSTRACT

Embodiments of the present disclosure generally relate to tape drives used for magnetic recording on tapes. Tape drives use tape heads that comprise a read head, a write head, and an additional head that may be a write head or a read head. The tape head is fabricated over a common substrate with the first head being formed first, followed by a shield layer, followed by the second head, followed by another shield layer, and finally followed by the third head. Fabricating the tape head over a common substrate is cost effective. The tape head can be wired such that fewer parallel connections between the heads and bond pads are present. As such, cross-talk between the wires and noise is reduced.

21 Claims, 10 Drawing Sheets

(56) References Cited

U.S. PATENT DOCUMENTS

| | | | | |
|---|---|---|---|---|
| 7,551,393 | B2* | 6/2009 | Biskeborn | G11B 5/4893 360/121 |
| 7,656,610 | B1* | 2/2010 | Campos | G11B 5/00826 360/121 |
| 7,751,148 | B1* | 7/2010 | Alstrin | G11B 5/4893 360/241.1 |
| 9,418,682 | B2 | 8/2016 | Biskeborn et al. | |
| 9,653,114 | B1* | 5/2017 | Biskeborn | G11B 5/00813 |
| 9,786,301 | B1* | 10/2017 | Li | G11B 5/3912 |
| 9,997,180 | B1* | 6/2018 | Biskeborn | G11B 5/3909 |
| 10,832,712 | B1* | 11/2020 | Seagle | G11B 5/3977 |
| 2004/0141255 | A1* | 7/2004 | Ogawa | G11B 5/3977 360/129 |
| 2006/0039082 | A1* | 2/2006 | Biskeborn | G11B 5/4893 360/129 |
| 2007/0030594 | A1* | 2/2007 | Biskeborn | G11B 5/10 360/129 |
| 2008/0112077 | A1 | 5/2008 | Maejima et al. | |
| 2015/0179191 | A1* | 6/2015 | Biskeborn | G11B 5/4893 360/121 |
| 2016/0125897 | A1* | 5/2016 | Biskeborn | G11B 5/3163 360/121 |
| 2018/0286436 | A1* | 10/2018 | Biskeborn | G11B 5/17 |

\* cited by examiner

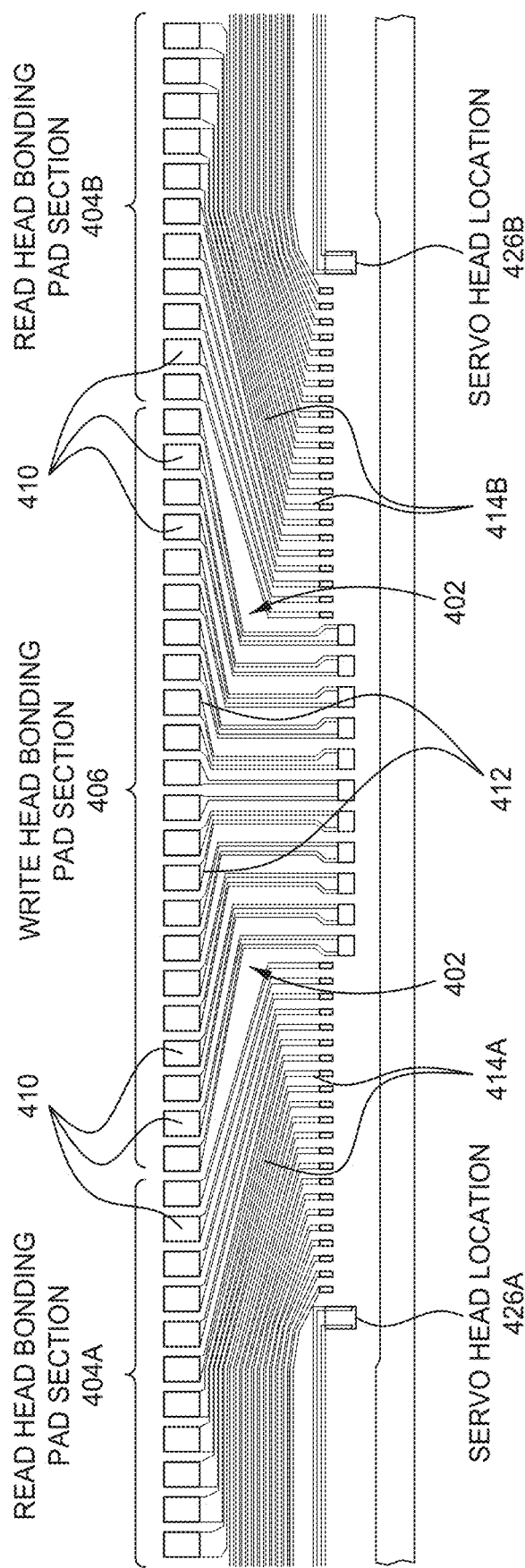

SHIELDING BETWEEN HEADS FOR TAPE DRIVE

BACKGROUND OF THE DISCLOSURE

Field of the Disclosure

Embodiments of the present disclosure generally relate to shielding tape heads used for magnetic recording on tapes.

Description of the Related Art

Tape heads are used to record and readback information on tapes by magnetic processes. The tape heads use a plurality of servo heads to read servo tracks to align the heads for reading data stored on data tracks. The servo heads and data heads are typically formed using sensors disposed between two shield layers.

A tape head usually comprises a read head and a write head. The read head and the write head may be fabricated separately and then glued together to form a collective tape head. The tape head comprises at least one read head and at least one write head which are separated by the glue.

The read head consists of a plurality of channel readers while the write head consists of a plurality of channel writers. The tape head typically comprises three heads whereby at least one head is a read head and at least one head is a write head. The third head can be either another read head or another write head. It is quite costly to assembly a tape head from three independently formed heads that are glued together.

Therefore, there is a need in the art for a more cost effective tape head.

SUMMARY OF THE DISCLOSURE

Embodiments of the present disclosure generally relate to tape drives used for magnetic recording on tapes. Tape drives use tape heads that comprise a read head, a write head, and an additional head that may be a write head or a read head. The tape head is fabricated over a common substrate with the first head being formed first, followed by a shield layer, followed by the second head, followed by another shield layer, and finally followed by the third head. Fabricating the tape head over a common substrate is cost effective. The tape head can be wired such that fewer parallel connections between the heads and bond pads are present. As such, cross-talk between the wires and noise are reduced.

In one embodiment, a tape head comprises: a first read head disposed over a substrate; a first electrically insulating layer disposed over the first read head; a first shield layer disposed over the first electrically insulating layer; a second electrically insulating layer disposed over the first shield layer; a write head disposed over the second electrically insulating layer; a third electrically insulating layer disposed over the write head; a second shield layer disposed over the third electrically insulating layer; a fourth electrically insulating layer disposed over the second shield; and a second read head disposed over the fourth electrically insulating layer.

In another embodiment, a tape head comprises: a first write head disposed over a substrate; a first electrically insulating layer disposed over the first write head; a first shield layer disposed over the first electrically insulating layer; a second electrically insulating layer disposed over the first shield layer; a read head disposed over the second electrically insulating layer; a third electrically insulating layer disposed over the read head; a second shield layer disposed over the third electrically insulating layer; a fourth electrically insulating layer disposed over the second shield layer; and a second write head disposed over the fourth electrically insulating layer.

In another embodiment, a tape head comprises: a first read head comprising a first plurality of read head channels; a write head disposed above the first read head, the write head comprising a plurality of write head channels; a second read head disposed above the write head, wherein the second read head comprises a second plurality of read head channels; a plurality of bond pads; and a plurality of wires coupled between each bond pad of the plurality of bond pads and a corresponding channel of the first plurality of read head channels, the second plurality of read head channels, and the plurality of write head channels, wherein the plurality of wires coupled between the plurality of write head channels and corresponding bond pads are spaced apart by a first distance, wherein the plurality of wires coupled between the first plurality of read head channels and corresponding bond pads are spaced apart from the plurality of wires coupled between the plurality of write head channels and corresponding bond pads by a second distance, and wherein the first distance is less than the second distance.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4A is a schematic illustration of improved wiring between bonding pads and read and write heads according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Embodiments of the present disclosure generally relate to tape drives used for magnetic recording on tapes. Tape drives use tape heads that comprise a read head, a write head, and an additional head that may be a write head or a read head. The tape head is fabricated over a common substrate with the first head being formed first, followed by a shield layer, followed by the second head, followed by another shield layer, and finally followed by the third head. Fabricating the tape head over a common substrate is cost effective. The tape head can be wired such that fewer parallel connections between the heads and bond pads are present. As such, cross-talk between the wires and noise is reduced.

Figure 1A:
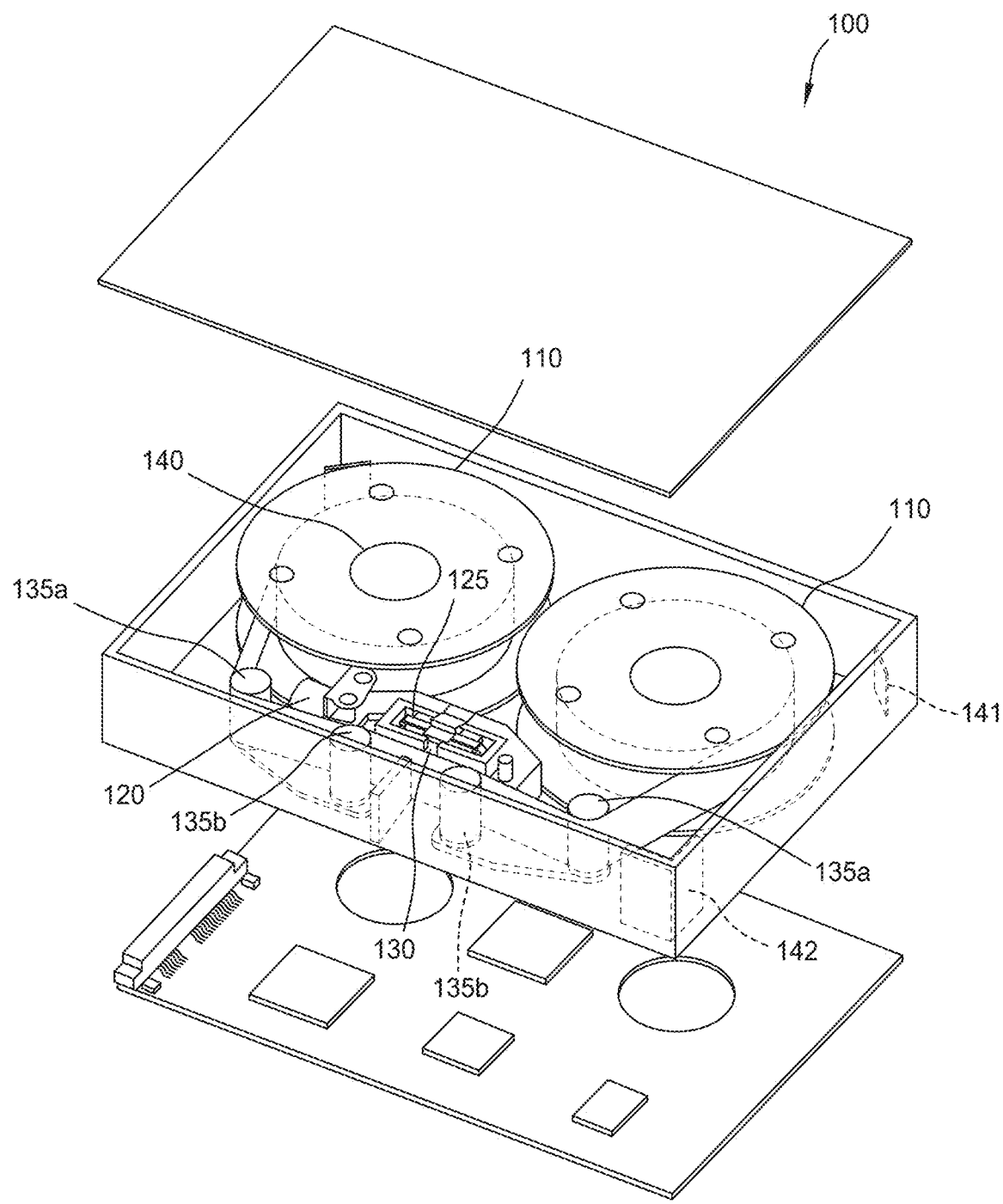
FIGS. 1A-1C illustrate a perspective exploded view and a simplified top down and side profile view of a tape embedded drive, in accordance with some embodiments.
Figure 1B:
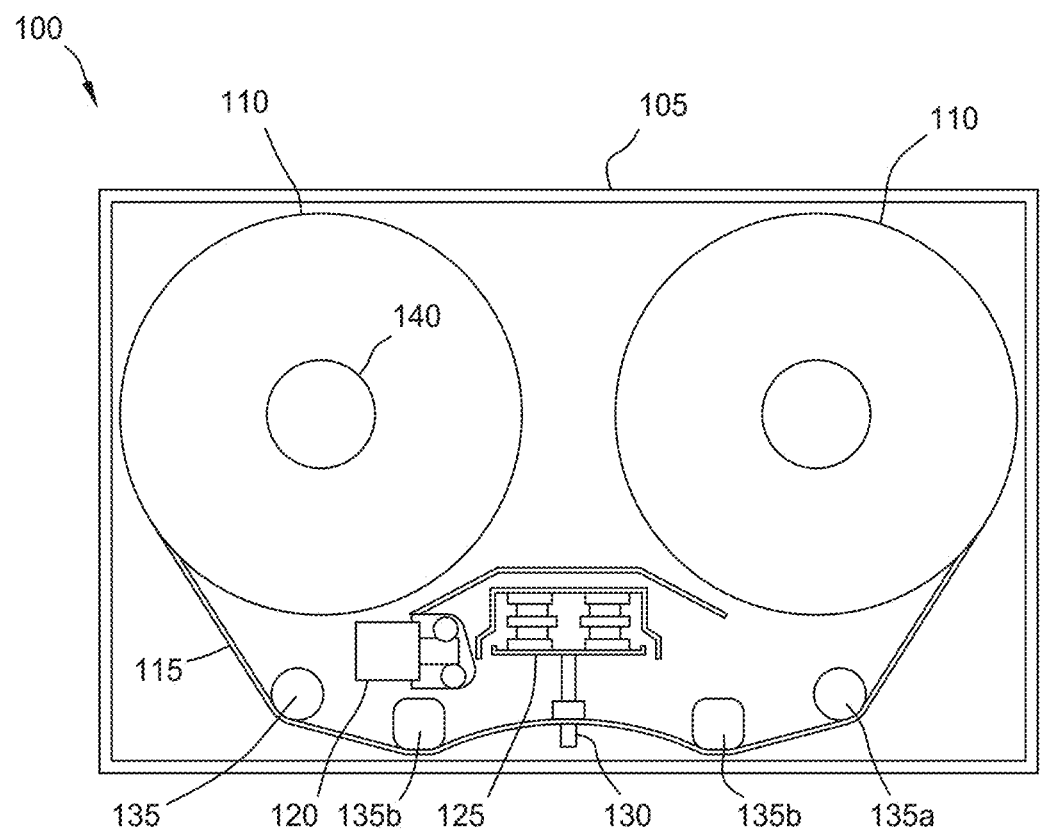
Figure 1C:
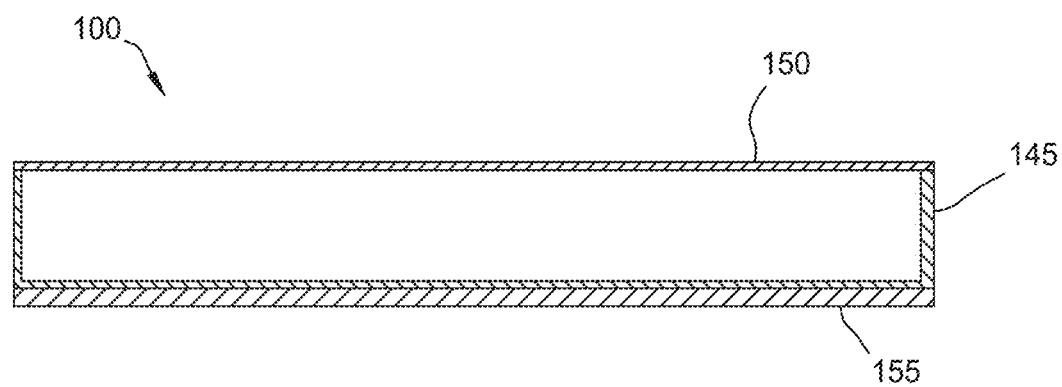

FIGS. 1A-1C illustrate a perspective exploded view and a simplified top down and side profile view of a tape embedded drive, in accordance with some embodiments. Although a tape embedded drive is shown as an example in FIGS. 1A-1C and 2, it is to be understood that the various tape head embodiments can be implemented as part of any tape drive, e.g., a tape drive that accepts tape media cartridges such as those that are linear tape-open (LTO) compatible. Focusing on FIG. 1B, for example, the tape embedded drive comprises a casing 105, one or more tape reels 110, one or more rotors (e.g., a stepping motor 120 (also known as a stepper motor), a voice coil motor (VCM) 125, etc.) a head assembly 130 with one or more read heads and one or more write heads, and tape guides/rollers 135a, 135b. Focusing on FIG. 1C, for example, the tape embedded drive further comprises a printed circuit board assembly (PCBA). In an embodiment, most of the components are within an interior cavity of the casing, except the PCBA, which is mounted on an external surface of the casing. The same components are illustrated in a perspective view in FIG. 1A.

In the illustrated embodiments, two tape reels 110 are placed in the interior cavity of the casing, with the center of the two tape reels on the same level in the cavity and with the head assembly 130 located in the middle and below the two tape reels. Tape reel motors 140 located in the spindles of the tape reels can operate to wind and unwind the tape media 115 in the tape reels. Each tape reel may also incorporate a tape folder to help the tape media 115 be neatly wound onto the reel. The tape media may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels are biased against the guides/rollers 135a, 135b (collectively referred to as guides/rollers 135) and are movably passed along the head assembly 130 by movement of the reels. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor and stepping motor may variably position the tape head(s) transversely with respect to the width of the recording tape. The stepping motor may provide coarse movement, while the voice coil motor may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape embedded drive 100 within the casing. In particular, as the head mechanism is internal to the casing in certain embodiments, the tape media 115 may not be exposed to the outside of the casing, such as in conventional tape drives. Thus, the tape media 115 does not need to be routed along the edge of the casing and can be freely routed in more compact and/or otherwise more efficient ways within the casing. Similarly, the head(s) and tape reels may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA is made of solid state electronics, environmental issues are less of a concern, so it does not need to be placed inside the casing 105. That leaves room inside casing for other components, particularly, the moving components and the tape media 115 that would benefit from a more protected environment.

In some embodiments, the tape embedded drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing.

In one embodiment, the cover 150 is used to hermetically seal the tape embedded drive. For example, the drive 100 may be hermetically sealed for environmental control by attaching (e.g., laser welding, adhesive, etc.) the cover to the base 145. The drive 100 may be filled by helium, nitrogen, hydrogen, or any other typically inert gas.

In some embodiments, other components may be added to the tape embedded drive 100. For example, a pre-amp for the heads may be added to the tape embedded drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

Figure 2:
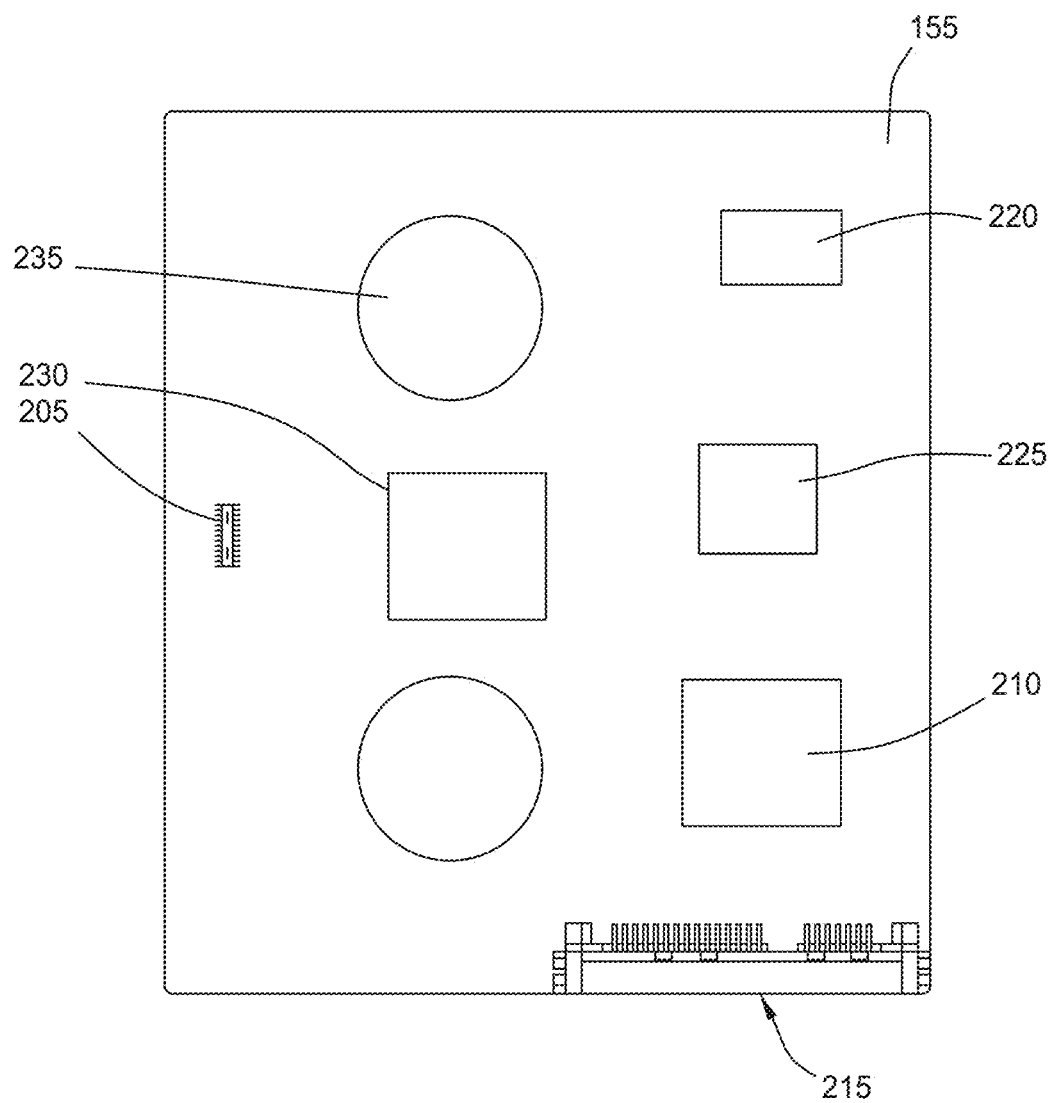
FIG. 2 illustrates a top perspective view of a printed circuit board assembly (PCBA) of the tape embedded drive, in accordance with some embodiments.

FIG. 2 illustrates a top perspective view of a printed circuit board assembly (PCBA) 155 of the tape embedded drive 100, in accordance with some embodiments. The PCBA 155 of the tape embedded drive may be the PCBA 155 of FIGS. 1A-1C. The PCBA 155 is attached to the bottom surface of the casing, with a connector 205 attaching to contacts or an interface on the bottom surface electrically/electronically connected to internal components in the casing. For example, the contacts or interface may be electrically connected to one or more motors and/or actuators within the casing. In one embodiment, the contacts/interface are built into the casing without comprising an air tight seal of the casing. In some embodiments, the connector 205 may be an electrical feed-through electrically connecting components inside the casing to those on the PCBA, while maintaining sealing of the casing.

The PCBA 155 can include various components, such as one or more controllers, one or more connectors 205, a system on a chip (SoC) 210, one or more data interfaces 215 (e.g., Serial ATA (SATA), Serial Attached SCSI (SAS), non-volatile memory express (NVMe), or the like), a memory 220, a Power Large Scale Integration (PLSI) 225, and/or data read channel controller 230. One or more cutouts 235 can be added in the PCBA 155 to provide additional space for tape reel motors, if needed. For example, the portion of the casing above the tape reel motors 140 may be raised to provide additional space for the motors. By providing cutouts 235, the thickness of the tape embedded drive 100 may be reduced as the PCBA 155 may surround the raised portion of the casing.

The PCBA 155 may extend along the entire bottom exterior surface of the casing 105 or may only partially extend along the surface, depending on how much space the various components need. In some embodiments, a second PCBA 155 may be located internally in the casing 105 and be in communication with the first PCBA 155, for example, via the connector 205.

In some embodiments, a controller on the PCBA 155 controls the read and write operations of the tape embedded drive 100. The controller may engage the tape spool motors and cause the tape spools to wind the tape film forwards or backwards. The controller may use the stepping motor and the voice coil motor to control placement of the head(s) over the tape film. The controller may also control output/input of data to or from the tape embedded drive 100 through the one or more interfaces 215, such as SATA or SAS.

Figure 3A:
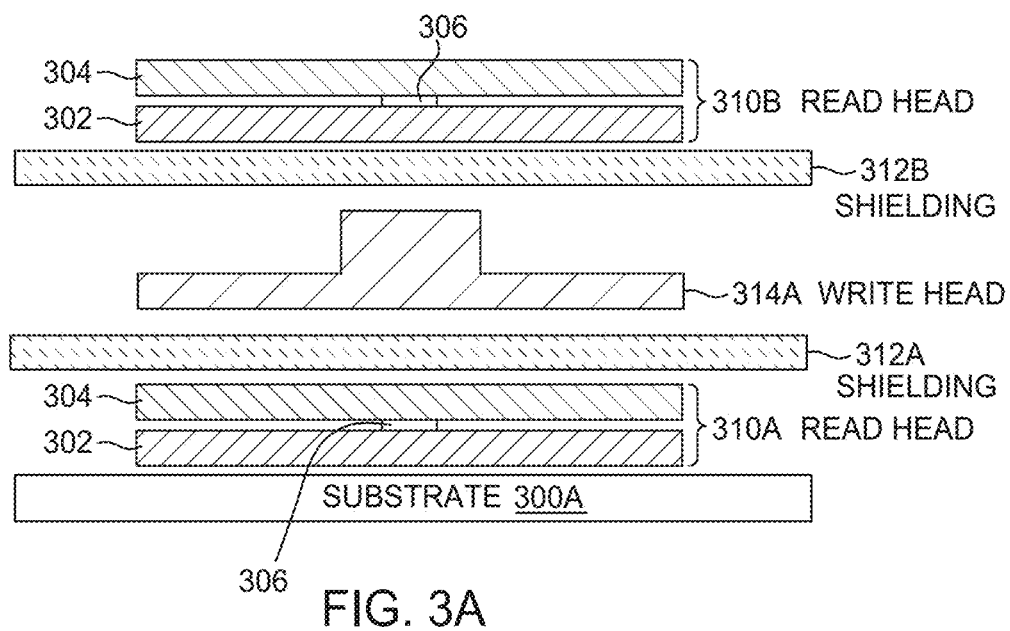
FIGS. 3A and 3B are schematic illustrations of tape head arrangements according to various embodiments.
Figure 3B:
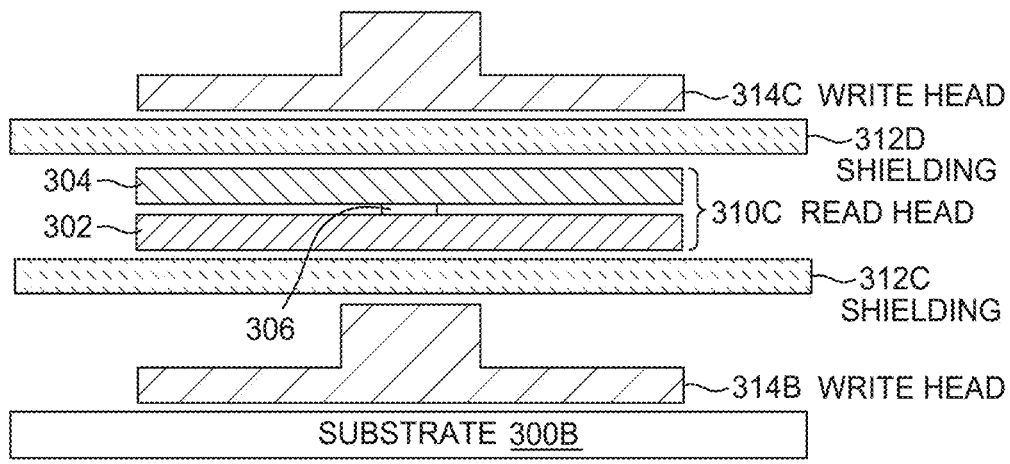

FIGS. 3A and 3B are schematic illustrations of tape head arrangements according to various embodiments. FIG. 3A is a schematic illustration of a tape head arrangement in a read head/write head/read head configuration, according to one embodiment. FIG. 3B is a schematic illustration of a tape head arrangement in a write head/read head/write head configuration, according to one embodiment. Furthermore, in other embodiments, the arrangement can be any number of iterations of read head/write head configurations or any number of write head/read head configurations. The read heads in FIGS. 3A and 3B each comprises a first shield 302, a second shield 304, and a sensor 306 sandwiched therebetween.

In regards to FIG. 3A, it is to be understood that while spacing is shown between the first shield 302 of the lower read head 310A and the substrate 300A, the spacing is filled with an electrically insulating material, such as alumina, to isolate the substrate 300A from the lower read head 310A. Similarly, it is to be understood that while spacing is shown between the second shield 304 of the lower read head 310A and the lower shielding 312A, the spacing is filled with an electrically insulating material, such as alumina, to isolate the lower read head 310A from the lower shielding 312A. Additionally, it is to be understood that while spacing is shown between the lower shielding 312A and the write head 314A, the spacing is filled with an electrically insulating material, such as alumina, to isolate the lower shielding 312A from the write head 314A. Also, it is to be understood that while spacing is shown between the write head 314A and the upper shielding 312B, the spacing is filled with an electrically insulating material, such as alumina, to isolate the write head 314A from the upper shielding 312B. Finally, it is to be understood that while spacing is shown between the upper shielding 312B and the first shield 302 of the upper read head 310B, the spacing is filled with an electrically insulating material, such as alumina, to isolate the upper shielding 312B from the upper read head 310B.

In regards to FIG. 3B, it is to be understood that while spacing is shown between the lower write head 314B and the substrate 300B, the spacing is filled with an electrically insulating material, such as alumina, to isolate the substrate 300B from the lower write head 314B. Similarly, it is to be understood that while spacing is shown between the lower write head 314B and the lower shielding 312C, the spacing is filled with an electrically insulating material, such as alumina, to isolate the lower write head 314B from the lower shielding 312C. Additionally, it is to be understood that while spacing is shown between the lower shielding 312C and the first shield 302 of the read head 310C, the spacing is filled with an electrically insulating material, such as alumina, to isolate the lower shielding 312C from the read head 310C. Also, it is to be understood that while spacing is shown between the second shield 304 of the read head 310C and the upper shielding 312D, the spacing is filled with an electrically insulating material, such as alumina, to isolate the read head 310C from the upper shielding 312D. Finally, it is to be understood that while spacing is shown between the upper shielding 312D and the upper write head 314C, the spacing is filled with an electrically insulating material, such as alumina, to isolate the upper shielding 312D from the upper write head 314C.

The alignment of the read head to the write head and the alignment of the write head to the read head may be accurately positioned by using photolithographic tools. Furthermore, the read head/write head/read head configuration of FIG. 3A and the write head/read head/write head configuration of FIG. 3B illustrates an assembly of a single channel, such that the read head configuration is a single channel and the write head configuration is a single channel. However, the structure, read head/write head/read head configuration or write head/read head/write head configuration, may have about 8 channels per read head and about 8 channels per write head to about 10 channels per read head and about 10 channels per write head. The number of channels listed is not intended to be limiting, but to provide examples of possible embodiments.

As noted above, the read heads 310A-310C and the write heads 314A-314C are separated by shielding 312A-312D. The shielding 312A-312D may be any suitable material to diminish or block noise between the read heads 310A-310C and the write heads 314A-314C, such as "cross-talk", where the signals from the write heads 314A-314C may interfere with the signals from the read heads 310A-310C and vice-versa. In one embodiment, the shielding 312A-312D is a single layer structure. In another embodiment, the shielding 312A-312D is a multilayer structure. In one embodiment, the shielding 312A-312D comprises non-magnetic materials. In another embodiment, the shielding 312A-312D comprises magnetic materials. For example, an appropriate shielding 312A-312D may be comprise copper, NiFe, and/or any other appropriate shielding materials.

As will be discussed below with regards to FIGS. 6A and 6B, the poles of the write head 314A-314C are parallel with each other, so that the two parallel write elements of the write heads 314A-314C may operate in either direction. The write head 314A-314C may have one or more deep notches (i.e., a cut into the write wafer), such that the deep notch is about 1.5 times to about 5 times the write head gap spacing. The gap size listed is not intended to be limiting and other sizes may be applicable in other embodiments.

The shielding 312A-312D is distinct from shielding layers that are commonly present in read heads, (e.g., first shield 302 and second shield 304). Furthermore, the read heads 310A-310C and write heads 314A-314C are formed over a common substrate 300A, 300B and built successively rather than being independently formed and glued together. More specifically, prior to the instant disclosure, a read head/write head/read head structure was conventionally formed by forming a first read head, a write head, and a second read head individually. Thereafter, the write head was glued to the first read head, and the second read head was glued to the write head. Similarly, prior to the instant disclosure, a write head/read head/write head was conventionally formed by forming a first write head, a read head, and a second write head individually. Thereafter, the read head was glued to the first write head, and the second write head was glued to the read head. The instant disclosure improves upon the prior fabrication techniques and the resulting structures, by eliminating the glue and forming the structure as one item.

For example, in certain embodiments, the read head/write head/read head structure is formed by first forming the first read head 310A on or over a substrate 300A. Thereafter, and prior to forming the write head 314A, a lower shielding 312A is formed on or over the first read head 310A. The lower shielding 312A is distinct from the first read head, and more specifically the second shield 304 of the first read head 310A, and the write head 314A. Thereafter, the write head 314A is formed on or over the lower shielding 312A. Following formation of the write head 314A, the upper shielding 312B is formed on or over the write head 314A. The upper shielding structure is distinct from the write head 314A and the second read head 310B, and more specifically the first shield 302 of the second read head 310B. Finally, the second read head 310B is formed on or over the upper shielding 312B. Thus, no glue is used to fabricate the read head/write head/read head structure. Furthermore, the integrated fabrication of the read head/write head/read head structure permits sequential fabrication of the read head 310A, write head 314A, and read head 310B. The resulting read head/write head/read head with shielding instead of gluing is easier to manufacture, is lower in cost, allows for precise alignment of the read heads 310A, 310B and write head 314A, and has a highly controlled spacing between the read heads 310A, 310B and write head 314A due to the precisely fabricated shielding 312A, 312B rather than a random amount of glue. The shielding 312A, 312B also minimizes crosstalk between read heads 310A, 310B and the write head 314A.

As another example, in certain embodiments, the write head/read head/write head structure is formed by first forming the first write head 314B on or over a substrate 300B. Thereafter, and prior to forming the read head 310C, a lower shielding 312C is formed on or over the first write head 314B. The lower shielding 312C is distinct from the first shield 302 the read head 310C. Thereafter, the read head 310C is formed on or over the lower shielding 312C. Following formation of the read head 310C, the upper shielding 312D is formed on or over the read head 310C. The upper shielding 312D is distinct from the second shield 304 of the read head 310C. Finally, the upper write head 314C is formed on or over the upper shielding 312D. Thus, no glue is used to fabricate the write head/read head/write head structure. Furthermore, the integrated fabrication of the write head/read head/write head structure permits sequential fabrication of the write head 314B, read head 310C, and write head 314C. The resulting write head/read head/write head structure with shielding instead of gluing is easier to manufacture, is lower in cost, allows for precise alignment of the reader and writers, and has a highly controlled spacing between the reader and writers due to the precisely fabricated shielding structures rather than a random amount of glue. The shielding structures also minimize crosstalk between the read head 310C and the writer heads 314B, 314C.

FIG. 4A is a schematic illustration of improved wiring between bonding pads 410 and read and write heads according to one embodiment. The servo head locations 426A, 426B are shown. For simplicity, the read heads 310A-310C and write heads 314A-314C are not shown. The embodiment shown in FIG. 4A illustrates a read head/write head/read head configuration. It is to be understood that the embodiment shown in FIG. 4A is equally applicable to a write head/read head/write head configuration. The bonding pads 410 are arranged in three sections, a first read head bonding pad section 404A, a write head bonding pad section 406, and a second read head bonding pad section 404B. Furthermore, the read and write heads (not shown) are wired in a way that the write head bonding pad leads 412 connect to the one or more bonding pads 410 in the write head bonding pad section 406 and the read head bonding pad leads 414A, 414B are arranged so that the read head bonding pad leads 414A, 414B on either side are connected to one or more bonding pads 410 on the respective read head bonding pad section 404A, 404B (i.e., the read head bonding pad leads 414A, 414B do not cross the write head bonding pad leads 412). A space or a gap between the write head bonding pad leads 412 and the read head bonding pad leads 414A, 414B are indicated by an arrow 402. The space or the gap may be any appropriate distance, such that cross-talk is minimized and/or avoided. In the embodiment shown in FIG. 4A, and correlating to the read head/write head/read head structure of FIG. 3A, the read head bonding pad leads 414A that are coupled to the bonding pads 410 in the read head bonding pad section 404A would ultimately be connected to read head 310A. Similarly, the write head bonding pad leads 412 that are coupled to the bonding pads 410 in the write head bonding pad section 406 would ultimately be connected to the write head 314A. Finally, the read head bonding pad leads 414B that are coupled to the bonding pads 410 in the read head bonding pad section 404B would ultimately be connected to the read head 310B. FIG. 4A illustrates the general wiring layout for a read head/write head/read head structure to minimize and/or avoid cross-talk.

Figure 4B:
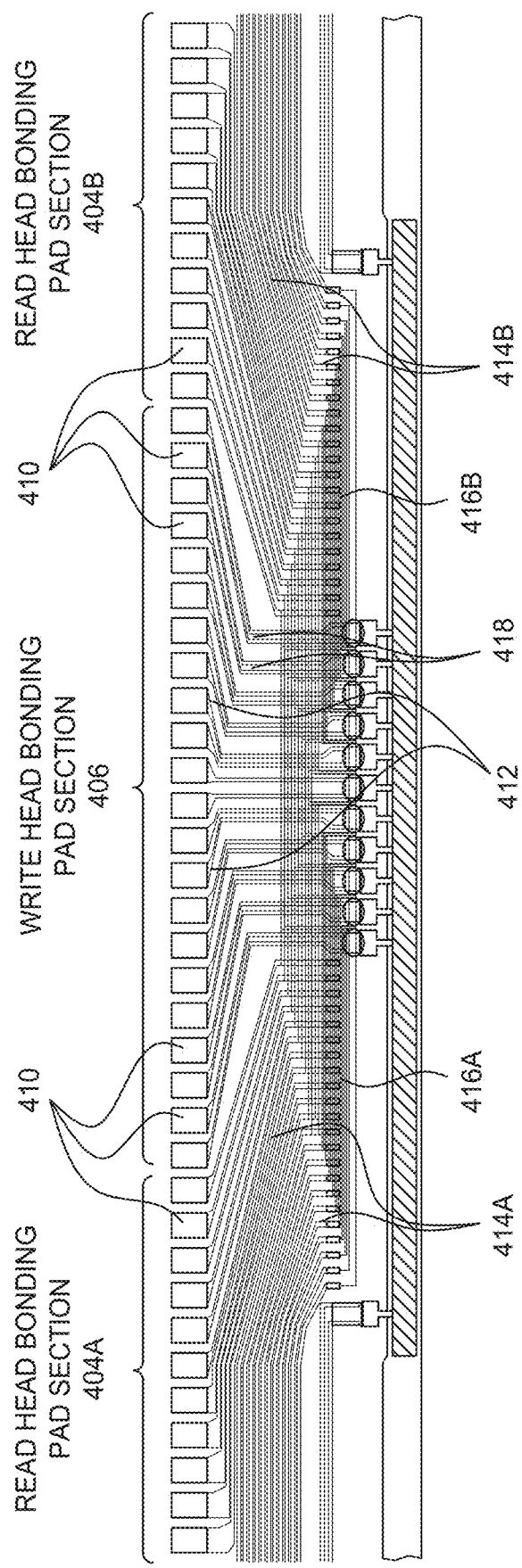
FIG. 4B is a schematic illustration of improved wiring between bonding pads and read and write heads of FIG. 4A.

FIG. 4B is a schematic illustration of improved wiring between bonding pads 410 and read and write heads (not shown) of FIG. 4A. In FIG. 4B, the specific lead connections are further illustrated. Specifically, for a read head/write head/read head structure, the heads are vertically arranged whereas the bonding pads are linearly arranged. FIG. 4B provides the illustration of further connecting to the various heads. In one embodiment, the bonding pads 410 of read head bonding pad section 404A are wired to the bottom read head 310A of the read head/write head/read head structure and the bonding pads 410 of the read head bonding pad section 404B are wired to the top read head 310B of the read head/write head/read head structure. In another embodiment, the bonding pads 410 of the read head bonding pad section 404A are wired to the top read head 310B of the read head/write head/read head structure (it is understood that rather than a read head/write head/read head structure, a write head/read head/write head structure as illustrated in FIG. 3B is also contemplated) and the bonding pads 410 of the read head bonding pad section 404B are wired to the bottom read head 310A of the read head/write head/read head structure. In FIG. 4B, the leftmost horizontal lines 416A indicate the bottom read head 310A connecting leads that are connected between the bottom read head 310A and the read head bonding pad leads 414A. The rightmost lines 416B indicate the top read head connecting leads that are connected between the top read head 310B and the top read head bonding pad leads 414B. The centermost lines 418 that indicate the write head connecting leads connect between the write head 314A and the write head bonding pad leads 412.

Figure 4C:
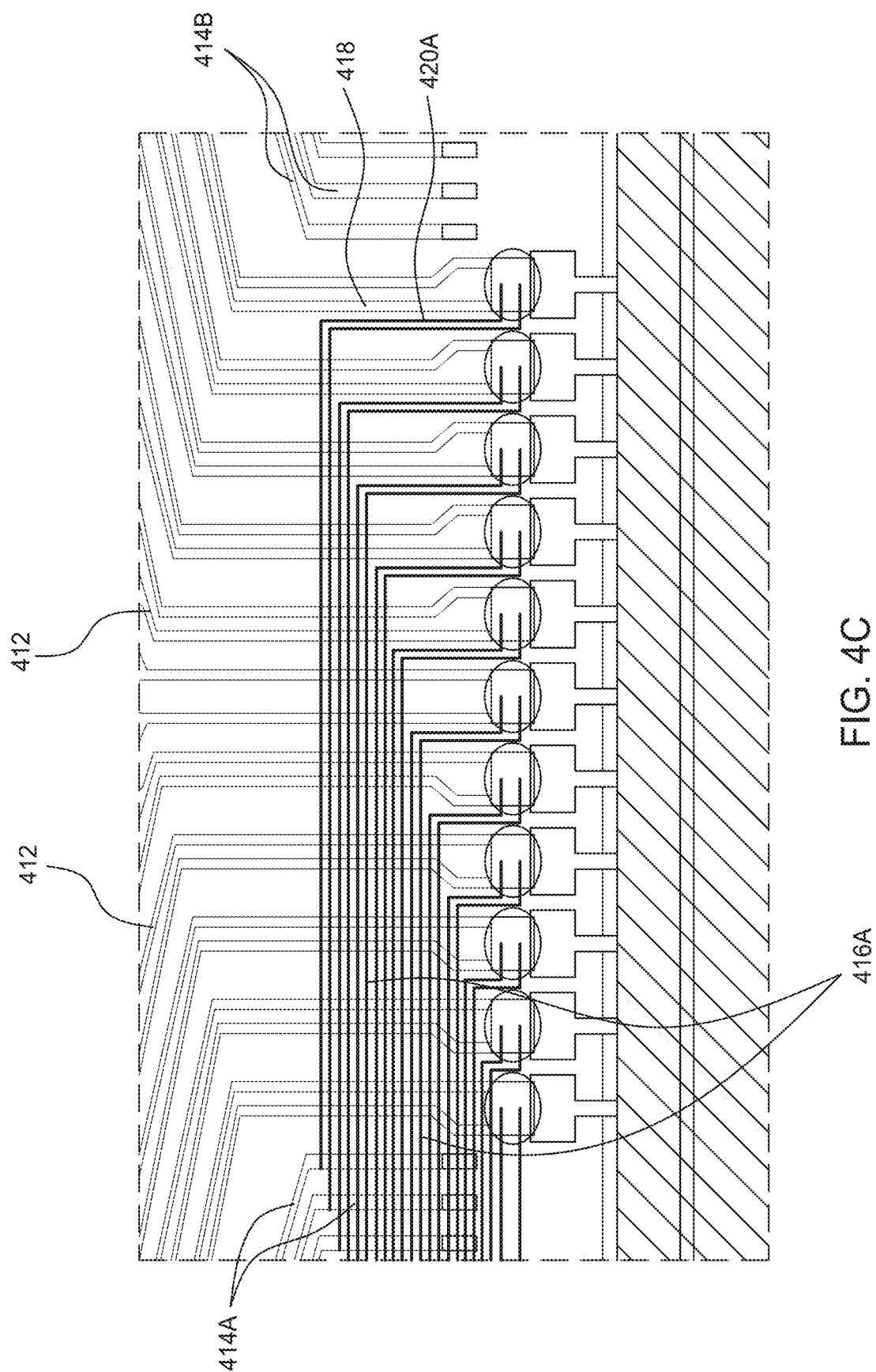
FIG. 4C is a zoomed in view of FIG. 4B.

FIG. 4C is a zoomed in view of FIG. 4B. More specifically, FIG. 4C illustrates a close up view of the leftmost lines 416A from FIG. 4B. A first portion 420A of the read head 310A leads extends vertical and substantially parallel to the centermost lines 418 representing the write head connection leads. The first portion 420A is parallel to the centermost lines 418 for as short a distance as possible. As the write head 314A is further away from the bonding pads 410 of the read head bonding pad section 404A, the likelihood that the read head lead is parallel to the write head lead is increased. When the read head lead and the write head lead are parallel, the read head leads and the write head leads are in close proximity, thus increasing the likelihood for cross-talk or noise to occur during a read operation. The embodiment shown in FIG. 4C illustrates as small as possible distance for read head leads and write head leads to be parallel.

Figure 4D:
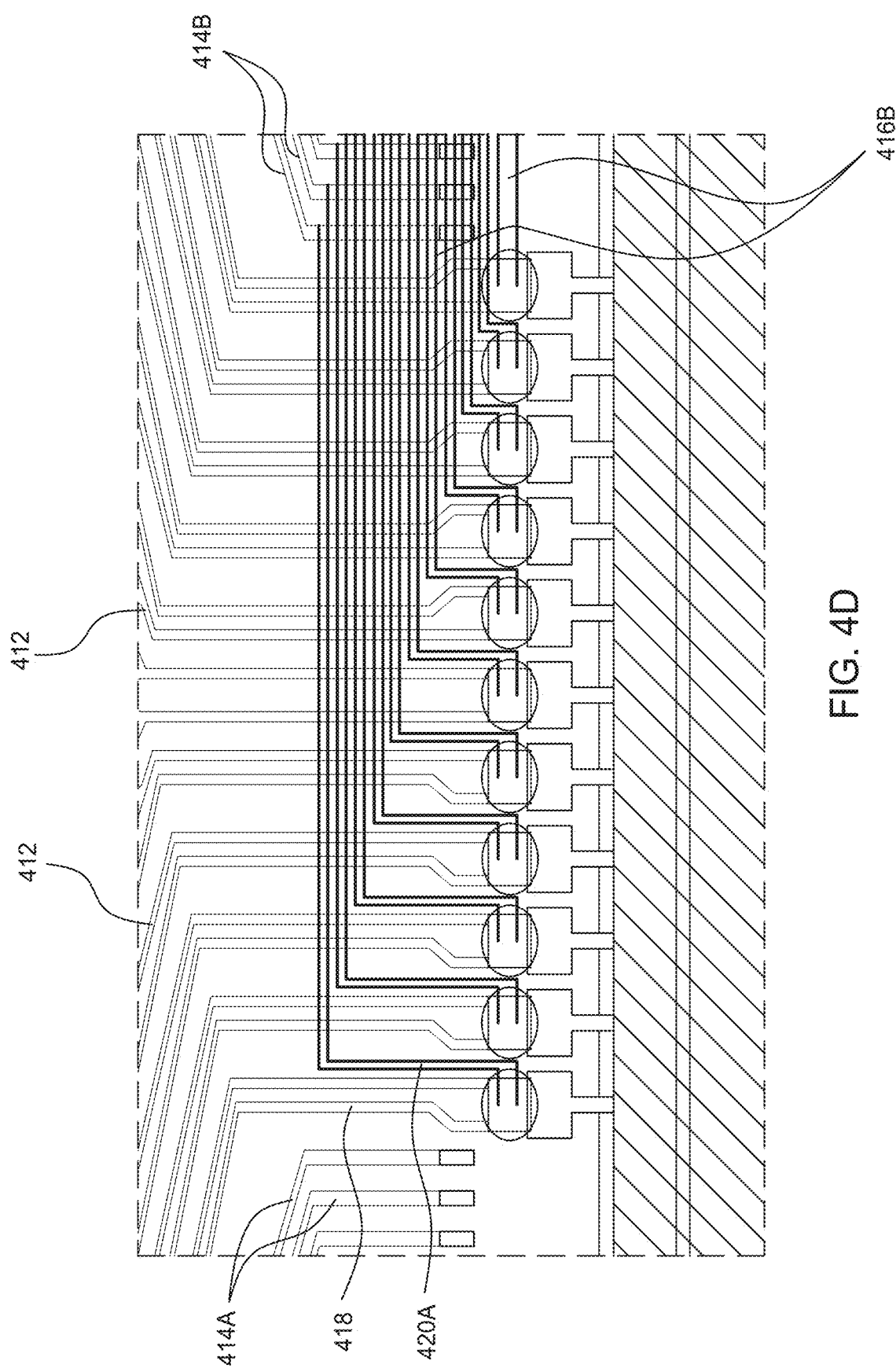
FIG. 4D is a zoomed in view of FIG. 4B.

FIG. 4D is a zoomed in view of FIG. 4B. More specifically, FIG. 4D illustrates a close up view of the rightmost lines from FIG. 4B. A first portion 420B of the read head 310B leads extends vertical and substantially parallel to the centermost lines 418 representing the write head connection leads. The first portion 420B is parallel to the centermost lines 418 for as short a distance as possible. As the write head 314A is further away from the bonding pads 410 of the read head bonding pad section 404B, the likelihood that the read head lead is parallel to the write head lead is increased. When the read head lead and the write head lead are parallel, the read head leads and the write head leads are in close proximity, thus increasing the likelihood for cross-talk or noise to occur during a read operation. The embodiment shown in FIG. 4D illustrates as small as possible distance for read head leads and write head leads to be parallel.

Figure 5:
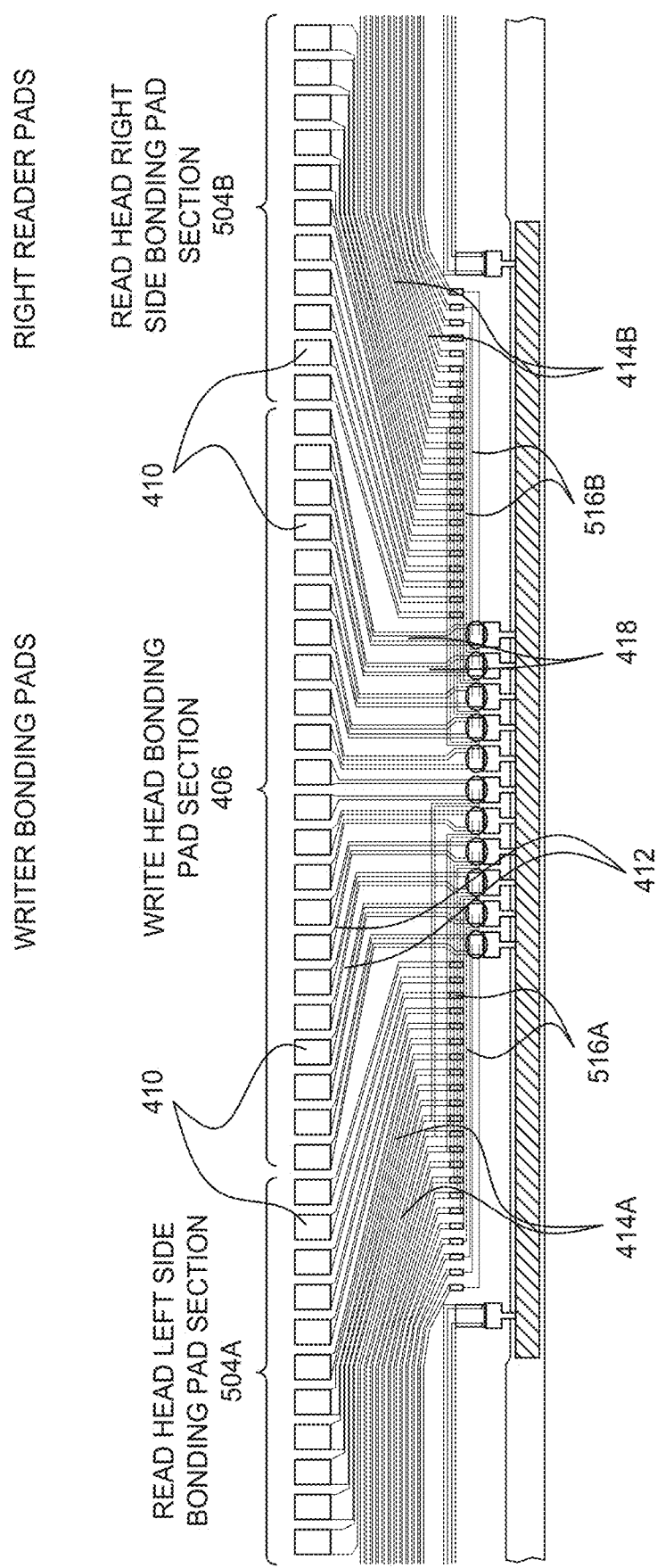
FIG. 5 is a schematic illustration of improved wiring between bonding pads and read and write heads according to another embodiment.

FIG. 5 is a schematic illustration of improved wiring between bonding pads and read and write heads according to another embodiment. Aspects of FIGS. 4A-4D may be similar to the description of FIG. 5. Rather than having all of the leads from the bottom read head 310A be directed to the read head bonding pad section 404A (or read head bonding pad section 404B), the leads are split into groups based upon a left-right concept. More specifically, the leads 516A on the left side of both the bottom read head 310A and the top read head 310B are directed to the read head left side bonding pad section 504A. Similarly, the leads 516B on the right side of the bottom read head 310A and top read head 310B are directed to the read head right side bonding pad section 504B. Stated another way, half of the leads 516A are connected the bottom read head 310A while the other half of the leads 516A are connected to the top read head 310B. Similarly, half of the leads 516B are connected to the bottom read head 310A while the other half of the leads 516B are connected to the top read head 310B. Any remaining read leads of the read head/write head/read head structure, if applicable (i.e., odd number of read leads), are connected to the bonding pads 410 of either the read head left side bonding pad section 504A or the read head right side bonding pad section 504B. Other configurations of the read lead connections to the read head/write head/read head structures may be applicable. Furthermore, by splitting the read lead connections from the read head/write head/read head structure to the bonding pads 410, the number of parallel read leads and write leads decreases, which may result in less cross-talk and/or noise during read operations.

Figure 6A:
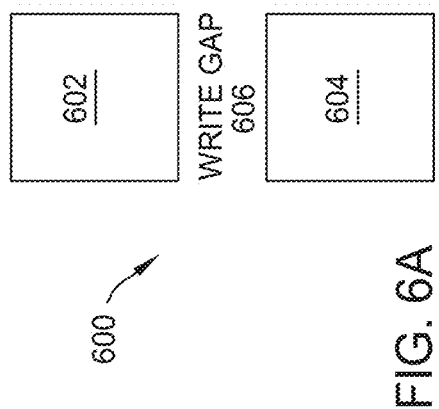
FIGS. 6A and 6B are schematic illustrations of write heads according to two embodiments.
Figure 6B:
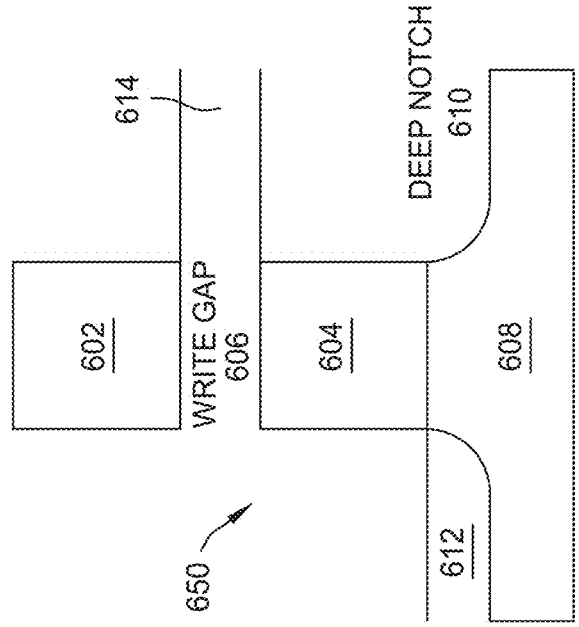

FIGS. 6A and 6B are schematic illustrations of write heads 600, 650 according to two embodiments. Aspects of the write heads 314A-314C described in FIGS. 3A and 3B may be similar to those described in FIGS. 6A and 6B. In one embodiment, the write heads 600, 650 of FIGS. 6A and 6B are contemplated to be the write heads 314A-314C in FIGS. 3A and 3B. FIG. 6A illustrates a write head 600, where there is a gap 606 between a first pole 602 of the write head 600 and a second pole 604 of the write head 600. FIG. 6B illustrates a write head 650 formed on a shield 608, which may be considered a substrate where a deep notch 610 is cut into the shield 608. The write head 650 may have one or more deep notches (i.e., a cut into the shield 608), such that the deep notch 610 has a depth 612 that is about 1.5 times to about 5 times the writer head gap 606 spacing 614. The gap size listed is not intended to be limiting and other sizes may be applicable in other embodiments. The poles 602, 604 of the write heads 600, 650 are parallel with each other, so that the two parallel write elements of the write heads 600, 650 may operate in either direction.

Figure 7:
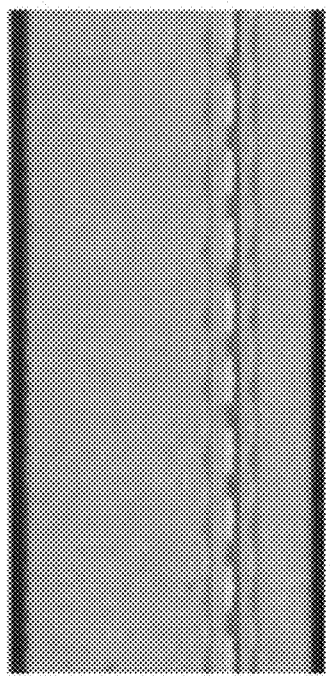
FIG. 7 is a schematic illustration of a tape head having a write head sandwiched between two read heads according to one embodiment.

FIG. 7 is a schematic illustration of a tape head having a write head sandwiched between two read heads according to one embodiment. In FIG. 7, the read head and the write head are formed on the same wafer, such that the reader/writer/reader is on a singular wafer instead of three separate wafers that are glued together. Any combination of read/writer or writer/reader combinations may be applicable. The tape head of FIG. 7 is a 10 channel module, however, more or less channel modules may be applicable to other possible embodiments. Furthermore, the alignment of the read head to the write head may be done using photolithographic tools, such that the accuracy of the alignment of the read head to the write head is increased.

It is to be understood that while the description focuses on a longitudinal write head, the embodiments discussed herein are applicable to perpendicular recording heads as well.

Additionally, the read heads discussed herein are applicable to any read head structure such as a GMR or TMR head.

It is to be understood that the magnetic recording head discussed herein is applicable to a data storage device such as a hard disk drive (HDD) as well as a tape drive such as a tape embedded drive (TED) or an insertable tape media drive. An example TED is described in co-pending patent application titled "Tape Embedded Drive," U.S. application Ser. No. 16/365,034, filed Mar. 31, 2019, assigned to the same assignee of this application, which is herein incorporated by reference. As such, any reference in the detailed description to a HDD or tape drive is merely for exemplification purposes and is not intended to limit the disclosure unless explicitly claimed. Furthermore, reference to or claims directed to magnetic recording devices are intended to include both HDD and tape drive unless HDD or tape drive devices are explicitly claimed.

By using a common substrate and fabricating each read and write head above the same substrate, a tape head can be manufactured cost effectively.

In one embodiment, a tape head comprises: a first read head disposed over a substrate; a first electrically insulating layer disposed over the first read head; a first shield layer disposed over the first electrically insulating layer; a second electrically insulating layer disposed over the first shield layer; a write head disposed over the second electrically insulating layer; a third electrically insulating layer disposed over the write head; a second shield layer disposed over the third electrically insulating layer; a fourth electrically insulating layer disposed over the second shield layer; and a second read head disposed over the fourth electrically insulating layer. The first read head comprises a topmost shield layer which is distinct from the first shield layer. The second read head comprises a bottommost shield layer which is distinct from the second shield layer. The write head comprises a notch and a write gap, and wherein the notch has a height that is equal to between about 1.5 and about 5 times greater than the write gap. The write head comprises a two pole write head without a notch. The first shield layer comprises a magnetic material. A magnetic recording device comprising the tape head is also contemplated.

In another embodiment, a tape head comprises: a first write head disposed over a substrate; a first electrically insulating layer disposed over the first write head; a first shield layer disposed over the first electrically insulating layer; a second electrically insulating layer disposed over the first shield layer; a read head disposed over the second electrically insulating layer; a third electrically insulating layer disposed over the read head; a second shield layer disposed over the third electrically insulating layer; a fourth electrically insulating layer disposed over the second shield layer; and a second write head disposed over the fourth electrically insulating layer. The second shield layer comprises a non-magnetic material. The non-magnetic material comprises copper. The write head comprises a first plurality of channels. The first read head comprises a second plurality of channels, and wherein a number of the second plurality of channels is equal to a number of the first plurality of channels. The number of the first plurality is between 7 and 11. A magnetic recording device comprising the tape head is also contemplated.

In another embodiment, a tape head comprises: a first read head comprising a first plurality of read head channels; a write head disposed above the first read head, the write head comprising a plurality of write head channels; a second read head disposed above the write head, wherein the second read head comprises a second plurality of read head channels; a plurality of bond pads; and a plurality of wires coupled between each bond pad of the plurality of bond pads and a corresponding channel of the first plurality of read head channels, the second plurality of read head channels, and the plurality of write head channels, wherein the plurality of wires coupled between the plurality of write head channels and corresponding bond pads are spaced apart by a first distance, wherein the plurality of wires coupled between a the first plurality of read head channels and corresponding bond pads are spaced apart from the plurality of wires coupled between the plurality of write head channels and corresponding bond pads by a second distance, and wherein the first distance is less than the second distance. The plurality of bond pads includes an equal number of bond pads for the first read head, the write head, and the second read head, and wherein the plurality of bond pads are arranged linearly. The bond pads for the write head are disposed in between the bond pads for the first read head and the bond pads for the second read head. The bond pads to a linear left of the bond pads for the write head are coupled to the first read head. The plurality of first read head channels are arranged linearly and have a first left portion and a first right portion and the plurality of second read head channels are arranged linearly and have a second left portion and a second right portion. A magnetic recording device comprising the tape head is also contemplated.

While the foregoing is directed to embodiments of the present disclosure, other and further embodiments of the disclosure may be devised without departing from the basic scope thereof, and the scope thereof is determined by the claims that follow.

What is claimed is:
1. A tape head, comprising:
a first read head disposed over a substrate;
a first electrically insulating layer disposed over the first read head;
a first shield layer disposed over the first electrically insulating layer;
a second electrically insulating layer disposed over the first shield layer;
a write head disposed over the second electrically insulating layer, the write head comprising a write gap and a write head shield having a notch;
a third electrically insulating layer disposed over the write head;
a second shield layer disposed over the third electrically insulating layer;
a fourth electrically insulating layer disposed over the second shield layer; and
a second read head disposed over the fourth electrically insulating layer.

2. The tape head of claim 1, wherein the first read head comprises a topmost shield layer which is distinct from the first shield layer.

3. The tape head of claim 2, wherein the second read head comprises a bottommost shield layer which is distinct from the second shield layer.

4. The tape head of claim 1, wherein the notch has a height that is equal to between about 1.5 and about 5 times greater than the write gap.

5. The tape head of claim 1, wherein the write head comprises a two pole write head without a notch.

6. The tape head of claim 1, wherein the first shield layer comprises a magnetic material.

7. A magnetic recording device comprising the tape head of claim 1.

8. A tape head comprising:
a first write head disposed over a substrate, the first write head comprising a first write gap and a first write head shield having a first notch;
a first electrically insulating layer disposed over the first write head;
a first shield layer disposed over the first electrically insulating layer;
a second electrically insulating layer disposed over the first shield layer;
a read head disposed over the second electrically insulating layer;
a third electrically insulating layer disposed over the read head;
a second shield layer disposed over the third electrically insulating layer;
a fourth electrically insulating layer disposed over the second shield layer; and
a second write head disposed over the fourth electrically insulating layer.

9. The tape head of claim 8, wherein the second shield layer comprises a non-magnetic material.

10. The tape head of claim 9, wherein the non-magnetic material comprises copper.

11. The tape head of claim 8, wherein the first write head comprises a first plurality of channels.

12. The tape head of claim 11, wherein the read head comprises a second plurality of channels, and wherein the number of the second plurality of channels is equal to the number of the first plurality of channels.

13. The tape head of claim 12, wherein the number of the first plurality is between 7 and 11.

14. A magnetic recording device comprising the tape head of claim 8.

15. A tape head, comprising:
a first read head comprising a first plurality of read head channels;
a write head disposed above the first read head, the write head comprising a plurality of write head channels, wherein the write head comprises a write gap and a write head shield having a notch;
a second read head disposed above the write head, wherein the second read head comprises a second plurality of read head channels;
a plurality of bond pads; and
a plurality of wires coupled between each bond pad of the plurality of bond pads and a corresponding channel of the first plurality of read head channels, the second plurality of read head channels, and the plurality of write head channels,
wherein the plurality of wires coupled between the plurality of write head channels and corresponding bond pads are spaced apart by a first distance, wherein a first wire of the plurality of wires coupled between the first plurality of read head channels and corresponding bond pads are spaced apart from a second wire of the plurality of wires coupled between the plurality of write head channels and corresponding bond pads by a second distance, the first wire being disposed adjacent to the second wire, and wherein the first distance is less than the second distance.

16. The tape head of claim 15, wherein the plurality of bond pads includes an equal number of bond pads for the first read head, the write head, and the second read head, and wherein the plurality of bond pads are arranged linearly.

17. The tape head of claim 16, wherein the bond pads for the write head are disposed in between the bond pads for the first read head and the bond pads for the second read head.

18. The tape head of claim 15, wherein the bond pads to a linear left of the bond pads for the write head are coupled to the first read head.

19. The tape head of claim 15, wherein a plurality of first read head leads are arranged linearly and have a first left portion and a first right portion and a plurality of second read head leads are arranged linearly and have a second left portion and a second right portion.

20. A magnetic recording device comprising the tape head of claim 15.

21. The tape head of claim 8, wherein the second write head comprises a second write gap and a second write head shield having a second notch.

* * * * *